US011503310B2

(12) United States Patent
Zhang et al.

(10) Patent No.: US 11,503,310 B2
(45) Date of Patent: Nov. 15, 2022

(54) METHOD AND APPARATUS FOR AN HDR HARDWARE PROCESSOR INLINE TO HARDWARE ENCODER AND DECODER

(71) Applicants: ATI TECHNOLOGIES ULC, Markham (CA); ADVANCED MICRO DEVICES, INC., Santa Clara, CA (US)

(72) Inventors: Lei Zhang, Markham (CA); David Glen, Toronto (CA); Kim A. Meinerth, Santa Clara, CA (US)

(73) Assignees: ATI TECHNOLOGIES ULC, Markham (CA); ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/176,826

(22) Filed: Oct. 31, 2018

(65) Prior Publication Data

US 2020/0137403 A1  Apr. 30, 2020

(51) Int. Cl.
  *H04N 19/186* (2014.01)
  *H04N 19/156* (2014.01)
  (Continued)

(52) U.S. Cl.
  CPC ........... *H04N 19/186* (2014.11); *G06T 5/007* (2013.01); *G06T 7/90* (2017.01); *H04N 19/124* (2014.11);
  (Continued)

(58) Field of Classification Search
  None
  See application file for complete search history.

(56) References Cited

U.S. PATENT DOCUMENTS 5,491,515 A * 2/1996 Suzuki ................ H04N 19/61
  348/401.1
6,466,220 B1 * 10/2002 Cesana ................. G06T 1/20
  345/537
(Continued)

FOREIGN PATENT DOCUMENTS

KR  10-2017-0106022 A   9/2017
WO     2014130343 A2    8/2014
(Continued)

OTHER PUBLICATIONS

Korean Intellectual Property Office; International Search report and Written Opinion; International Application No. PCT/US2019/054198; dated Jan. 20, 2020.
(Continued)

*Primary Examiner* — Sultana M Zalalee (57) ABSTRACT

A device includes an encoder, decoder, codec or combination thereof and inline hardware conversion units that are operative to convert stored image data into one of: an HDR/WCG format and an SDR/SCG format during the conversion process. Each of the inline hardware conversion units is operative to perform the conversion process independent of another read operation with the memory that stores the image data to be converted. In one example, an encoding unit is operative to perform a write operation with a memory to store the converted image data after completing the conversion process. In another example, a decoding unit is operative to perform a read operation with the memory to retrieve the image data from the memory before initiating the conversion process. In another example, an encoder/decoder unit is operative to perform at least one of: the read operation and the write operation.

34 Claims, 7 Drawing Sheets

(51) Int. Cl.
*H04N 19/124* (2014.01)
*G06T 5/00* (2006.01)
*G06T 7/90* (2017.01)
*H04N 19/70* (2014.01)

(52) U.S. Cl.
CPC .......... *H04N 19/156* (2014.11); *H04N 19/70* (2014.11); *G06T 2207/10024* (2013.01); *G06T 2207/20208* (2013.01)

(56) References Cited

U.S. PATENT DOCUMENTS

| | | | |
|---|---|---|---|
| 9,489,706 B2 | 11/2016 | Levy et al. | |
| 2005/0024363 A1* | 2/2005 | Estrop | G09G 5/363 345/501 |
| 2005/0024384 A1* | 2/2005 | Evans | G09G 5/363 345/604 |
| 2007/0252746 A1* | 11/2007 | Hoffert | H04N 5/775 341/158 |
| 2008/0193023 A1* | 8/2008 | Canel-Katz | H04N 19/593 382/232 |
| 2011/0080519 A1* | 4/2011 | Chowdhry | H04N 19/115 348/453 |
| 2011/0194618 A1* | 8/2011 | Gish | H04N 19/59 375/240.25 |
| 2012/0188406 A1* | 7/2012 | Hyatt | H04N 5/2173 348/231.99 |
| 2013/0329069 A1* | 12/2013 | Kurashige | H04N 19/436 348/220.1 |
| 2014/0002694 A1* | 1/2014 | Levy | G06T 1/20 348/239 |
| 2014/0139513 A1* | 5/2014 | Mammou | G06T 1/20 345/419 |
| 2014/0210847 A1* | 7/2014 | Knibbeler | G11B 20/10 345/589 |
| 2014/0282624 A1* | 9/2014 | Holt | G06T 1/20 719/318 |
| 2015/0092834 A1* | 4/2015 | Cote | H04N 19/129 375/240.02 |
| 2015/0243200 A1* | 8/2015 | Pan | G09G 5/10 345/590 |
| 2015/0356945 A1* | 12/2015 | Fazzini | G09G 5/02 345/590 |
| 2016/0203618 A1* | 7/2016 | Li | G06T 5/009 345/591 |
| 2016/0205372 A1* | 7/2016 | Liu | H04N 5/20 |
| 2016/0284314 A1* | 9/2016 | Darshan | G06T 3/40 |
| 2016/0366449 A1* | 12/2016 | Stessen | H04N 19/85 |
| 2017/0061584 A1* | 3/2017 | Lim | G06T 5/002 |
| 2017/0085878 A1* | 3/2017 | Sole Rojals | H04N 19/46 |
| 2017/0085879 A1* | 3/2017 | Minoo | H04N 19/124 |
| 2017/0085895 A1 | 3/2017 | Gu et al. | |
| 2017/0186141 A1* | 6/2017 | Ha | H04N 9/646 |
| 2017/0251211 A1* | 8/2017 | Froehlich | H04N 9/68 |
| 2017/0256039 A1* | 9/2017 | Hsu | G06T 5/009 |
| 2017/0359488 A1* | 12/2017 | Chen | H04N 1/6019 |
| 2018/0013927 A1* | 1/2018 | Atkins | G09G 5/02 |
| 2018/0040095 A1* | 2/2018 | Seetharamaiah | G06T 15/005 |
| 2018/0097527 A1* | 4/2018 | Boyd | H03M 7/24 |
| 2018/0152684 A1* | 5/2018 | Wozniak | H04N 5/765 |
| 2018/0189215 A1* | 7/2018 | Boesch | G06F 30/34 |
| 2018/0278808 A1* | 9/2018 | Hsu | H04N 5/235 |
| 2018/0288433 A1 | 10/2018 | Oh et al. | |
| 2019/0215517 A1* | 7/2019 | Ramasubramonian | H04N 19/80 |
| 2019/0356891 A1* | 11/2019 | Zhang | H04N 11/20 |

FOREIGN PATENT DOCUMENTS

| | | |
|---|---|---|
| WO | 2015-130797 A1 | 9/2015 |
| WO | 2016168652 A1 | 10/2016 |

OTHER PUBLICATIONS

Banterle, Francesco et al.; High Dynamic Range Imaging and Low Dynamic Range Expansion for Generating HDR Content; Computer Graphics forum; vol. 28, No. 8; pp. 2343-2367; Dec. 9, 2009.
Extended European Search Report, EP19878819.2, dated Jul. 29, 2022, 9 pages.

* cited by examiner

METHOD AND APPARATUS FOR AN HDR HARDWARE PROCESSOR INLINE TO HARDWARE ENCODER AND DECODER

BACKGROUND OF THE DISCLOSURE

Image data, such as a video or a picture, can be displayed on a display device using a specific format compatible to the display device. A high dynamic range and wide color gamut (HDR/WCG) format is used for displaying videos that have image data spanning a larger luminance and color range than a conventional standard dynamic range and standard color gamut (SDR/SCG) format. An exemplary SCG relates to BT.709 parameter values. For example, HDR/WCG videos can provide an enhanced viewer experience and can more accurately reproduce scenes that include additional dark areas and bright highlights, such as emissive light sources and reflections. SDR/SCG videos are characterized by image data having a smaller luminance and color range than the HDR/WCG videos.

Depending on a type of the display device, a conversion process of image data is performed for transitioning the image data into one of the HDR/WCG format and the SDR/SCG format. Conventional HDR/WCG converters are used to specifically meet HDR and WCG broadcast needs when rendering HDR/WCG content. Shaders written in software are typically used to perform the conversion process and to render the HDR/WCG content on the display device. Each software shader includes one or more computer-readable statements for facilitating production of shading in an image, such as light, darkness, and color control, rendering specific effects on graphics hardware.

Usually, the conversion process includes multiple steps to convert the image data between the HDR/WCG format and the SDR/SCG format. Because software shaders are used to perform the conversion process, there is an impact on an overall performance (e.g., during a video game). For example, software shaders perform various memory accesses in each step of the conversion process to retrieve the image data from memory (e.g., GPU memory) and store the converted image data to the memory, thereby resulting in an increased memory bandwidth use and increased power consumption during the conversion process. Accordingly, there exists a need for improved method and apparatus for performing the conversion process in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Briefly, a method and apparatus processes image data, such as a video or a picture, for transitioning into one of: a high dynamic range and wide color gamut (HDR/WCG) format and a standard dynamic range and standard color gamut (SDR/SCG) format. For example, the image data can be converted from the HDR/WCG format to the SDR/SCG format. The image data can also be converted from SDR/SCG format to the HDR/WCG format. Further, the image data can be converted from the HDR/WCG format to a different HDR/WCG format.

In one example, the method and apparatus performs, using logic, a read operation with memory (e.g., GPU memory) to retrieve the image data from the memory before initiating the conversion process. The retrieved image data can be one of: a raw image data and a decoded image data. The method and apparatus converts, using a plurality of inline hardware conversion units (e.g., an inline color conversion unit), the retrieved image data to transition into one of: the HDR/WCG format and the SDR/SCG format during the conversion process, where each of the plurality of inline hardware conversion units performs the conversion process independent of another read operation with the memory. As used herein, the term "inline hardware conversion units" refer to hardware components or engines connected directly with one another that perform the conversion process without accessing the memory. The method and apparatus encodes, using an encoding unit, the converted image data and performs a write operation with the memory to store the encoded image data after completing the conversion process.

Stated in another way, each of the plurality of inline hardware conversion units performs the conversion process independent of another read operation or another write operation with the memory. For example, the conversion process independent of another read or write operation with the memory refers to a condition where each inline hardware conversion unit performs one or more steps associated with the conversion process without accessing the memory after an initial read operation to retrieve the image data.

In various embodiments, the plurality of inline hardware conversion units includes an inline color conversion unit, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit, an inline gamut remapping conversion unit that receives an output from the inline tone mapping conversion unit, and an inline re-gamma conversion unit that receives an output from the inline gamut remapping conversion unit. In one example, the transition into one of: the HDR/WCG format and the SDR/SCG format is achieved by performing, during the conversion process, a color conversion between a wide-gamut colorspace and a standard-gamut colorspace without accessing the memory. For example, the wide-gamut colorspace can be represented in the HDR/WCG format, and the standard-gamut colorspace can be represented in the SDR/SCG format.

In one embodiment, only one of the plurality of inline hardware conversion units has the logic to perform the read operation with the memory. The only one inline hardware conversion unit is a first inline hardware conversion unit that performs the read operation with the memory. There is also a last inline hardware conversion unit that has logic to perform the write operation with the memory. In this regard, none of the intervening inline hardware conversion units between the first inline hardware conversion unit and the last inline hardware conversion unit performs any read or write operation with the memory during the conversion process. Thus, during the conversion process, no access to the memory is performed before encoding of the retrieved image data.

In another example, the method and apparatus performs, using a decoding unit, a read operation with memory (e.g., GPU memory) to retrieve encoded image data from the memory and decodes the retrieved encoded image data before initiating the conversion process. The method and apparatus converts, using a plurality of inline hardware conversion units, the decoded image data to transition into one of: the HDR/WCG format and the SDR/SCG format during the conversion process, where each of the plurality of inline hardware conversion units performs the conversion process independent of another read operation with the memory. The method and apparatus performs, using logic, a write operation with the memory to store the converted image data after completing the conversion process.

In one embodiment, only one of the plurality of inline hardware conversion units has the logic to perform the write operation with the memory. The only one inline hardware conversion unit is a last inline hardware conversion unit that performs the write operation with the memory. There is also a first inline hardware conversion unit that has logic to perform the read operation with the memory. In this regard, none of the intervening inline hardware conversion units between the first inline hardware conversion unit and the last inline hardware conversion unit performs any read or write operation with the memory during the conversion process. Thus, during the conversion process, no access to the memory is performed after decoding of the encoded image data.

In yet another example, the method and apparatus performs, using logic, a read operation with memory to retrieve image data (e.g., raw image data or decoded image data) from the memory. The method and apparatus converts, using a plurality of inline hardware conversion units, to transition into one of: the HDR/WCG format and the SDR/SCG format during the conversion process, where each of the plurality of inline hardware conversion units performs the conversion process independent of another read operation with the memory. The method and apparatus encodes, using an encoding unit, the converted image data from the plurality of inline hardware conversion units after completing the conversion process. The method and apparatus decodes, using a decoding unit, encoded image data from the memory before initiating the conversion process. A programmable codec can be configured to serve as the encoding unit and the decoding unit. Depending on whether encoding or decoding operation is desired, the method and apparatus selects, using a selector, one of: the retrieved image data from the memory and the decoded image data from the decoding unit.

In one embodiment, the method and apparatus transmit the image data to the memory after performing at least one of: encoding the image data or decoding the image data. In another embodiment, only a first one of the plurality of inline hardware conversion units has logic to perform the read operation with the memory, and only a last one of the plurality of inline hardware conversion units has logic to perform a write operation with the memory. As such, none of the intervening inline hardware conversion units between the only first one of the plurality of inline hardware conversion units and the only last one of the plurality of inline hardware conversion units performs any read or write operation with the memory during the conversion process. In one example, the image data in the HDR/WCG format can be encoded or decoded in a perceptually quantized color space so that a color format at an input of a video encoding/decoding device (e.g., a unified codec) matches a supported color format of the display device at an output of the video encoding/decoding device.

Among other advantages, instead of using the software shaders, the present disclosure provides inline hardware conversion units having no software components that drain the power. Further, the software shaders increase the memory bandwidth requirements in a memory-to-memory path between the memory and the conversion units. Since the software shaders are not used for the conversion process, the software shaders can be used for gaming. Thus, the gaming performance is not degraded and the software shaders can be continuously used for gaming without having to consume resources for the conversion process. As such, an overall rendering operation and execution speed are improved at draw time of the image data.

Figure 1:
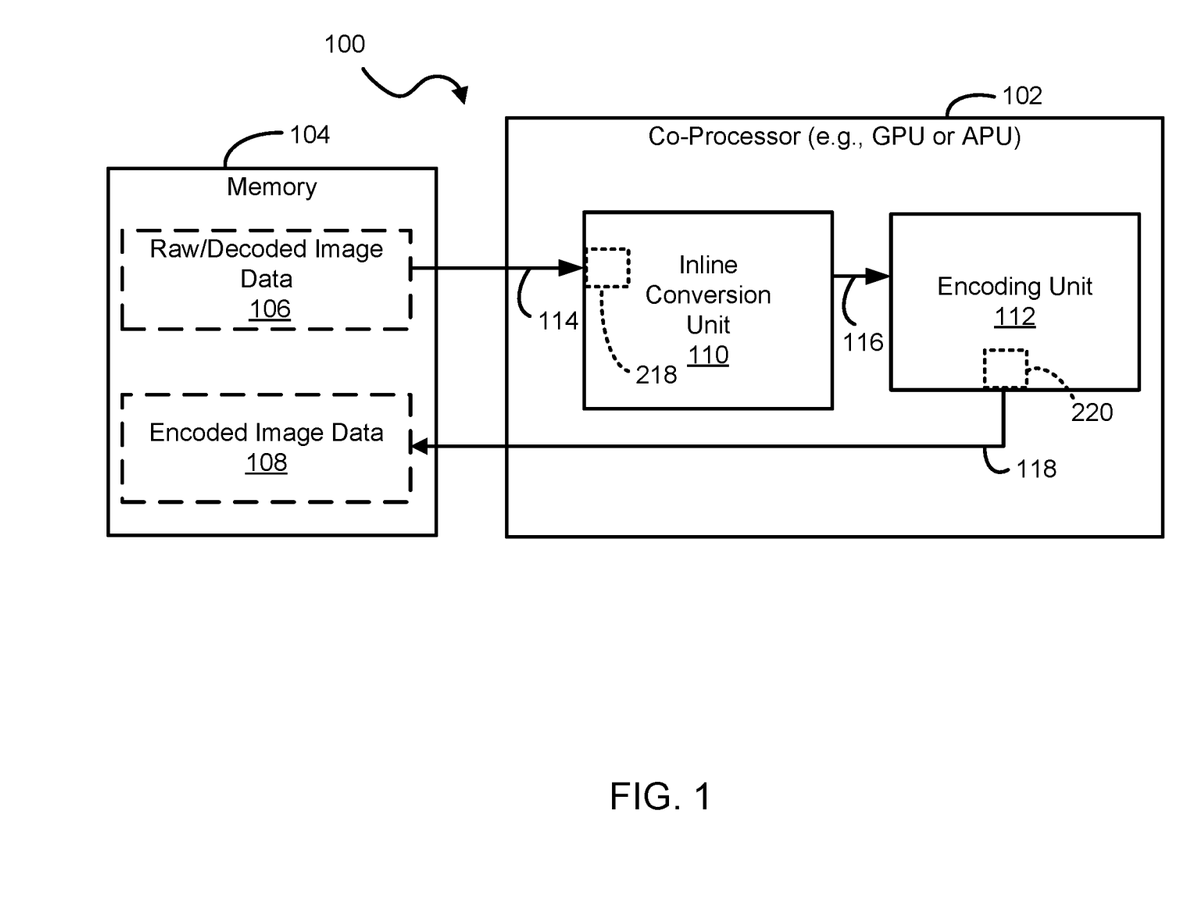
FIG. 1 is a schematic block diagram illustrating a first example of an apparatus for performing a conversion process of image data using an encoding unit in accordance with one embodiment set forth in the disclosure.

FIG. 1 illustrates a first example of an apparatus 100 for processing image data (e.g., a video and/or a picture) in accordance with embodiments of the present disclosure. In some implementations, the apparatus 100 includes any type of computing device suitable for implementing aspects of embodiments of the disclosed subject matter. Examples of computing devices include but are not limited to, workstations, servers, laptops, desktops, tablet computers, hand-held devices, game consoles, and the like, all of which are contemplated within the scope of FIG. 1, with reference to various components of the apparatus 100.

In one embodiment, the apparatus 100 includes a bus that, directly and/or indirectly, couples the following devices: a co-processor 102 (e.g., GPU or APU), a memory 104 (e.g., GPU memory), and other suitable components (e.g., another processor such as a CPU, input/output (I/O) port(s), I/O component(s), and a data storage or database such as a non-transitory storage medium, not shown). Any number of additional components, different components, and/or combinations of components is also included in the apparatus 100. In some implementations, the I/O component(s) include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touchscreen device, an interactive display device, a mouse, and/or the like.

In some embodiments, the apparatus 100 includes a processor, such as a CPU and a number of co-processors, a number of memory components, a number of I/O ports, a number of I/O components, and/or a number of storages. Additionally, any number of these components, or combinations thereof, is distributed and/or duplicated across a number of computing devices.

In one embodiment, the memory 104 includes computer-readable media in the form of volatile and/or nonvolatile memory. In one example, the memory 104 is disposed externally relative to any of the units 110, 112. Any other suitable memory arrangements can be employed.

In other embodiments, the memory 104 is removable, nonremovable, or a combination thereof. Examples include Random Access Memory (RAM); Read Only Memory (ROM); Electronically Erasable Programmable Read Only Memory (EEPROM); flash memory; optical or holographic media; magnetic cassettes, magnetic storage devices; and/or any other medium that can be used to store information and can be accessed by a computing device such as, for example, quantum state memory, and/or the like. A distributed memory system shared in one or more servers (e.g., web servers or non-web servers) is also contemplated to suit different applications.

In this example, the memory 104 stores raw or decoded image data 106, and also stores encoded image data 108 for subsequent processing. The image data can include the raw or decoded image data 106, or the encoded image data 108. In one example, the decoded image data can be retrieved from the memory 104. In another example, the decoded image data can be transmitted from another unit (e.g., a decoder).

In FIG. 1, the co-processor 102 includes an inline conversion unit 110 and an encoding unit 112 for implementing aspects of embodiments of a conversion process of the image data discussed herein. In one example, at least part of the units 110, 112 in the co-processor 102 can be stored in another processor. In another example, at least part of the raw or decoded image data 106 and the encoded image data 108 can be stored in the memory 104. Some or all of the functionality contemplated herein are implemented in hardware and/or firmware.

The illustrative apparatus 100 shown herein is not intended to suggest any limitation as to the scope of use or functionality of embodiments of the present disclosure. Neither should the illustrative apparatus 100 be interpreted as having any dependency or requirement related to any single component or combination of components illustrated therein. Additionally, various components depicted in FIGS. 1-4 are, in embodiments, integrated with various ones of the other components depicted therein (and/or components not illustrated), all of which are considered to be within the ambit of the present disclosure.

Figure 4:
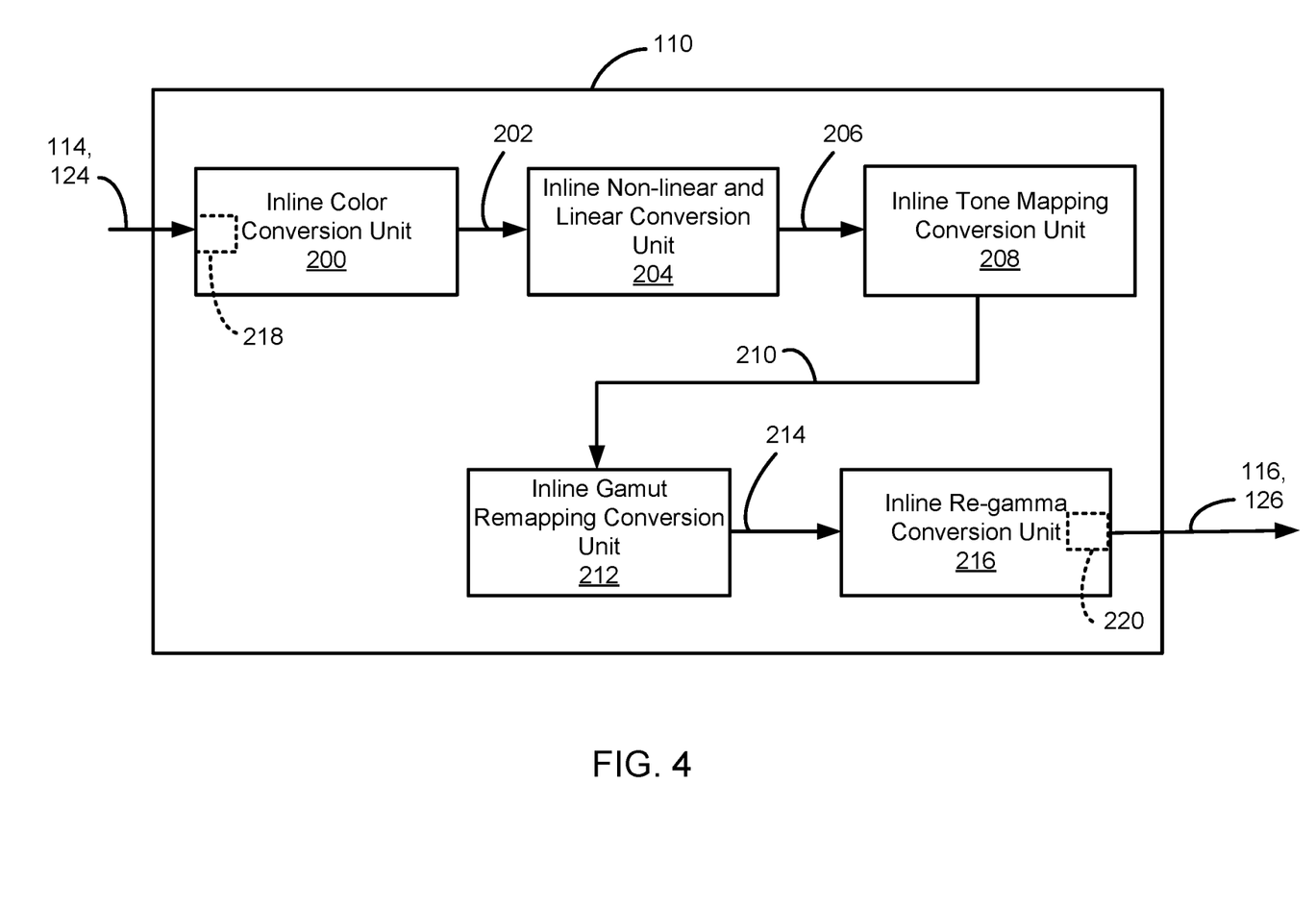
FIG. 4 is a block diagram illustrating the apparatus for performing the conversion process of the image data using an inline conversion unit shown in FIG. 1.

In this example, the inline conversion unit 110 is configured to perform a read operation with the memory 104 to retrieve the raw or decoded image data 106 from the memory 104 using memory fetch logic 218. In one embodiment, as shown in FIG. 4, the memory fetch logic 218 in the inline color conversion unit 200 is operative to perform the read operation with the memory 104 to retrieve the raw or decoded image data 106 from the memory 104. The retrieved image data 114 includes the raw or decoded image data 106. In another embodiment, any one of the sub units 204, 208, 212, 216 can include the memory fetch logic 218. Although the memory fetch logic 218 implemented in the inline conversion unit 110 is shown, the memory fetch logic 218 can be independent logic separate from the inline conversion unit 110.

In embodiments, the conversion process of the image data includes transitioning the image data into one of the HDR/WCG format and the SDR/SCG format. As discussed, in one example, the image data can be converted from the HDR/WCG format to the SDR/SCG format. In another example, the image data can be converted from SDR/SCG format to the HDR/WCG format. In yet another example, the image data can be converted from the HDR/WCG format to a different HDR/WCG format.

In FIG. 1, retrieved image data 114 includes the raw or decoded image data 106. The inline conversion unit 110 is configured to convert the retrieved image data 114 using one or more inline hardware conversion units for facilitating the transition into one of: the HDR/WCG format and the SDR/SCG format during the conversion process. It is advantageous that each of the inline hardware conversion units performs the conversion process independent of the read operation with the memory 104. The conversion process independent of the read operation with the memory 104 refers to performing the conversion process without accessing the memory 104. For example, the inline conversion unit 110 performs the conversion process before transmitting the converted image data 116 to the encoding unit 112 without accessing the memory 104.

Thus, during the conversion process, no access to the memory 104 is performed by the inline conversion unit 110. This creates a simplified conversion process due to less access to the memory-to-memory path between the memory 104 and the inline conversion unit 110. After completion of the conversion process, the inline conversion unit 110 is configured to generate converted image data 116.

As another example, if ten percent (10%) of resources of each software shader is shared for the conversion process, the gaming performance would have degraded by 10%. However, in the present disclosure, there is no degradation caused by such sharing. More specifically, the raw or decoded image data 106 is read from the memory 104 only once and is directly transmitted to the inline conversion unit 110 for performing the conversion process. No additional read operations accessing the memory 104 are necessary until the conversion process is completed. In one example, data shared between the sub units 200, 204, 208, 212, and 216 are inputted or outputted directly from one unit to the next unit inline. For example, as shown in FIG. 4, the color-converted image data 202 are directly inputted into the inline non-linear and linear conversion unit 204 from the inline color conversion unit 200 without first being stored in memory 104.

The encoding unit 112 is also configured to encode the converted image data 116 for subsequent processing. In one example, after completing the conversion process, the encoding unit 112 encodes the converted image data 116 using any of known in the art video compression schemes, such as MPEG-2, MPEG-4, H.264, H.265, VP8, and the like. Encoded image data 118 is generated by the encoding unit 112. The encoding unit 112 is configured to perform a write operation with the memory 104 to store the encoded image data 118 using memory write logic 220. In one example, the encoded image data 118 can be transmitted to the memory 104 for storage as the encoded image data 108 are generated. In another example, the encoded image data 118 can be transmitted downstream to be decoded by a receiving device, such as a set-top box, a media player, and the like. As such, there is no need for the encoding unit 112 to perform additional read operations with the memory 104 to retrieve the converted image data. In contrast, encoding and decoding units in conventional conversion units, perform respective read and write operations with the memory 104 during each step of the conversion process, causing an increased memory bandwidth and increased power consumption. As shown in FIG. 1, it is advantageous that an encoder path is simplified due to less access to the memory-to-memory path.

In the present disclosure, the inline conversion unit 110 performs the conversion process from the HDR/WCG format (e.g., HDR color gamut) to the SDR/SCG format (e.g., standard color gamut) without using the software shaders. In this configuration, since no software shaders are used, the power consumed by the software shaders is saved. Also, since only one read operation for the retrieved image data 114 and only one write operation for the encoded image data 118 are performed in the encoder path, a less memory bandwidth is required for traffic. In this example, the converted image data 116 is directly transmitted to the encoding unit 112. As used herein, direct transmission can include the use of one or more intervening components between units, such as other processing logic or conversion units 200, 204, 208, 212, 216, without writing (or reading) the image data to (or from) the memory 104.

Figure 2:
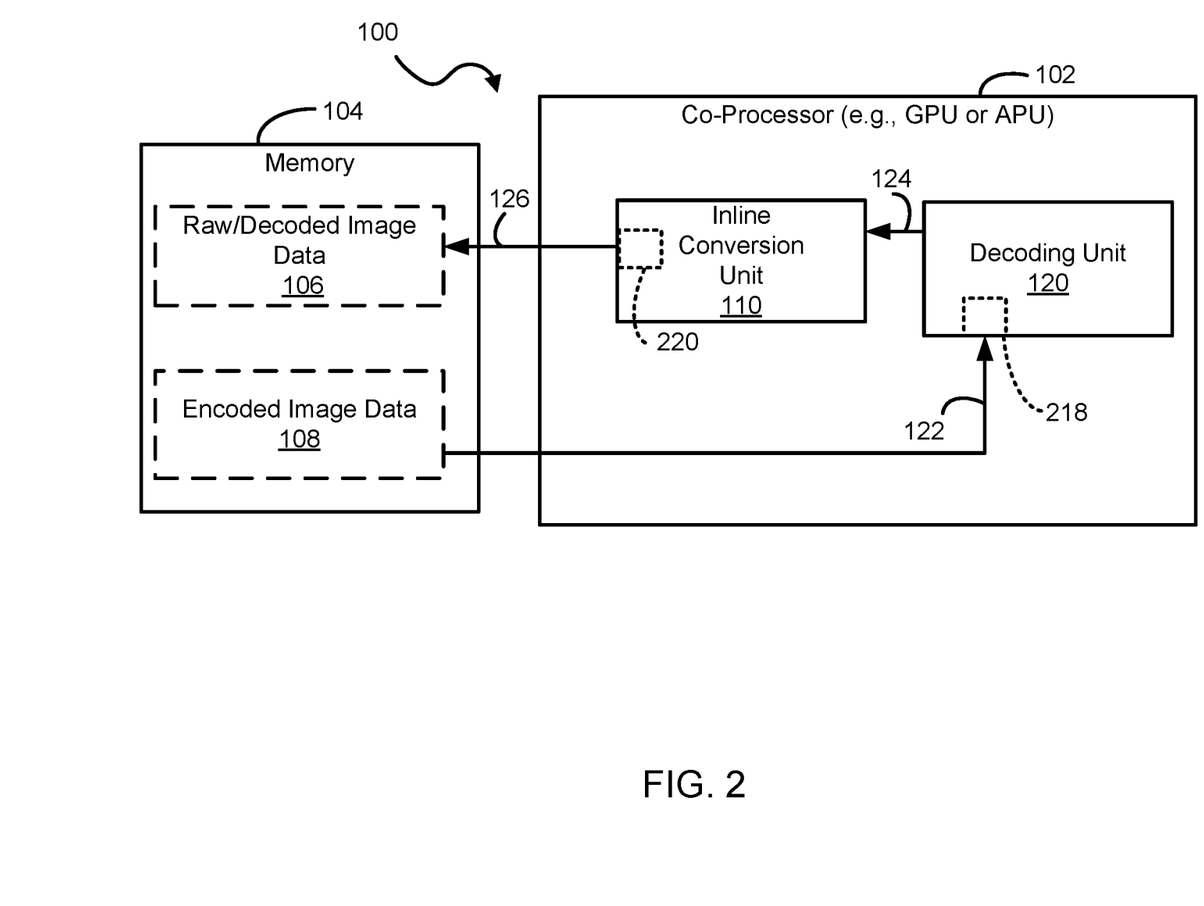
FIG. 2 is a schematic block diagram illustrating a second example of an apparatus for performing a conversion process of image data using a decoding unit in accordance with one embodiment set forth in the disclosure.

FIG. 2 illustrates a second example of the apparatus 100 for processing image data in accordance with embodiments of the present disclosure. In FIG. 2, the co-processor 102 includes the inline conversion unit 110 and a decoding unit 120 for implementing aspects of embodiments of a conversion process of the image data discussed herein. As discussed above, at least part of the units 110, 120 in the co-processor 102 can be stored in another processor, and some or all of the functionality contemplated herein are implemented in hardware and/or firmware.

In this example, the decoding unit 120 is configured to perform a read operation with the memory 104 using the memory fetch logic 218 to retrieve the encoded image data 108 from the memory 104. In FIG. 2, retrieved image data 122 includes the encoded image data 108. The decoding unit 120 is configured to decode the retrieved image data 122. In one example, the decoding unit 120 decodes the retrieved image data 122 in a perceptually quantized color space to match a color format of the raw or decoded image data 106 with a supported color format. Decoded image data 124 is generated by the decoding unit 120 and is transmitted to the inline conversion unit 110 for performing the conversion process.

The inline conversion unit 110 is configured to receive the decoded image data 124 and convert the image data 122 using one or more inline hardware conversion units for facilitating the transition into one of: the HDR/WCG format and the SDR/SCG format during the conversion process. As discussed above, it is advantageous that each of the inline hardware conversion units performs the conversion process independent of the read operation with the memory 104. The conversion process independent of the read operation with the memory 104 refers to performing the conversion process without accessing the memory 104. For example, the inline conversion unit 110 performs the conversion process after receiving the decoded image data 124 from the decoding unit 120 without accessing the memory 104.

Thus, during the conversion process, no access to the memory 104 is performed by the inline conversion unit 110. This creates a simplified conversion process due to less access to the memory-to-memory path between the memory 104 and the inline conversion unit 110. After completion of the conversion process, the inline conversion unit 110 is configured to generate converted image data 126 of the decoded image data 124. The inline conversion unit 110 is configured to perform a write operation with the memory 104 to store the converted image data 126 of the decoded image data 124 using the memory write logic 220. In one embodiment, as shown in FIG. 4, the memory write logic 220 in the inline re-gamma conversion unit 216 is operative to perform the write operation with the memory 104 to store the converted image data 126 to the memory 104. In another embodiment, any one of the sub units 200, 204, 208, 212 can be the memory write logic 220 operative to perform the write operation with the memory 104. Although the memory write logic 220 implemented in the inline conversion unit 110 is shown, the memory write logic 220 can be an independent logic separate from the inline conversion unit 110.

In one example, the converted image data 126 of the decoded image data 124 can be transmitted to the memory 104 for storage as the raw or decoded image data 106. In another example, the converted image data 126 of the decoded image data 124 can be transmitted to another unit (e.g., an encoder) to be encoded.

As shown in FIG. 2, it is advantageous that a decoder path is simplified due to less access to the memory-to-memory path. Also, since only one read operation for the retrieved image data 122 and only one write operation for the converted image data 126 are performed in the decoder path, a less memory bandwidth is required for traffic.

Figure 3:
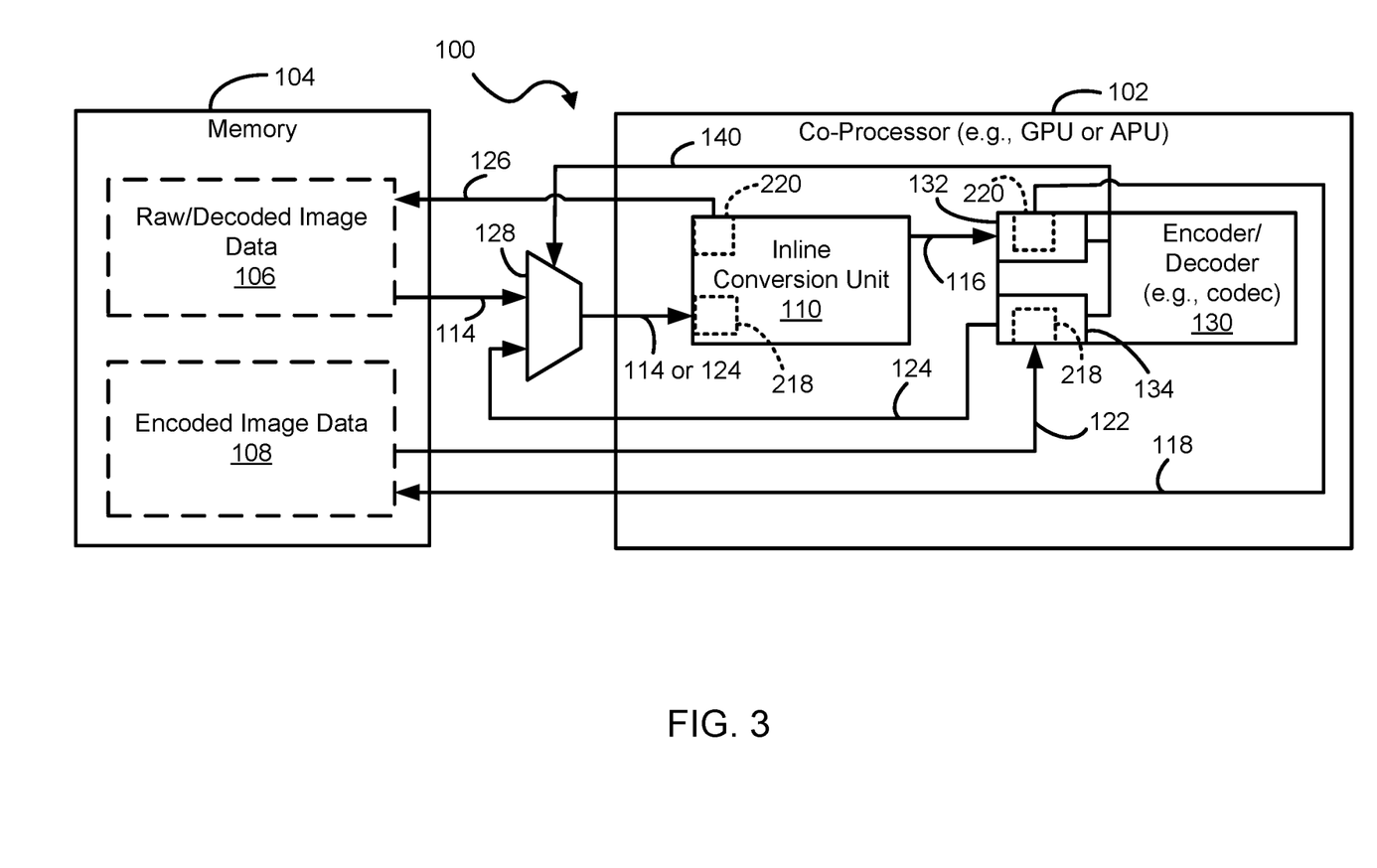
FIG. 3 is a schematic block diagram illustrating a third example of an apparatus for performing a conversion process of image data using a unified encoding and decoding unit in accordance with one embodiment set forth in the disclosure.

FIG. 3 illustrates a third example of the apparatus 100 for processing image data in accordance with embodiments of the present disclosure. In FIG. 3, the co-processor 102 includes the inline conversion unit 100 and an encoder/decoder 130 for implementing aspects of embodiments of a conversion process of the image data discussed herein. In this configuration, for performing a shared video encoder/decoder (or codec) function, the encoder/decoder 130 includes an encoding unit 132 and a decoding unit 134. The encoding unit 132 operates similarly to the encoding unit 112 of FIG. 1, while the decoding unit 134 operates similarly to the decoding unit 120 of FIG. 2. The encoder/decoder 130 interfaces with a single hardware HDR/WCG converter, such as the inline conversion unit 110. The encoder/decoder 130 is configured to perform either encoding operations (i.e., using the encoding unit 132) or decoding operations (i.e., using the decoding unit 134), as described in accordance with FIGS. 1 and 2. In one embodiment, the encoder/decoder 130 is a programmable codec that performs the encoding and/or decoding operations. That is, the programmable codec 130 is configurable to serve as the encoding unit 132 or the decoding unit 134 depending on the desired operation. In another embodiment, the encoder/decoder 130 may be implemented as separate encoding and decoding units. In other words, the encoding unit 132 and the decoding unit 134 maybe physical or logical.

Also, a selector 128 (e.g., a multiplexer) is operatively coupled between the memory 104 and the inline conversion unit 110 to select one of at least two inputs, such as the retrieved image data 114 shown in FIG. 1 (e.g., the raw or decoded image data 106) and the decoded image data 124 shown in FIG. 2 (e.g., the decoded image data generated by the decoding unit 120). In this example, the inline conversion unit 110 is configured to receive one of: the retrieved image data 114 having the raw or decoded image data 106, and the decoded image data 124 received from the decoding unit 134.

As an image rendering application running in the apparatus 100 of FIG. 3 may need to perform encoding or decoding operations, the selector 128 is operable to select either the retrieved image data 114 or the decoded image data 124 through a control signal 140. For example, during encoding operations, the encoding unit 132 enables the selector 128, via the control signal 140, to select the retrieved image data 114 to send to the inline conversion unit 110. During decoding operations, the decoding unit 134 enables the selector 128, via the control signal 140, to select the decoded image data 124 to send to the inline conversion unit 110. It should be noted that the selector 128 may be implemented in the co-processor 102, in the inline conversion unit 110, or in the encoder/decoder 130.

In some embodiments, the functionality of the selector 128 is implemented using configuration registers. In particular, the configuration registers may be configured to store configuration information that allows either the retrieved image data 114 to be sent to the inline conversion unit 110 during an encoding operation, or the decoded image data 124 to be sent to the inline conversion unit 110 during a decoding operation.

As described above, the apparatus 100 of FIG. 3 can operate in either an encoding mode or a decoding mode. For the encoding mode, an encoder path is created where a read, convert, encode, and write operation sequence is performed. In particular, the encoding unit 132 in the encoder/decoder 130 enables the selector 128, via the control signal 140, to transmit the retrieved image data 114 to the inline conversion unit 110. The inline conversion unit 110 receives the retrieved image data 114 having the raw or decoded image data 106, via the selector 128, using the memory fetch logic 218. The inline conversion unit 110 converts the image data 114, and generates the converted image data 116 of the retrieved image data 114. The encoding unit 132 receives the converted image data 116 from the inline conversion unit 110, and generates the encoded image data 118 based on the converted image data 116. The encoding unit 132 then writes the encoded image data 118 to the memory 104 for storage using the memory write logic 220.

For the decoding mode, a decoder path is created where a read, decode, convert, and write operation sequence is performed. In particular, the decoding unit 134 in the encoder/decoder 130 receives the retrieved image data 122 having the encoded image data 108 from the memory 104 using the memory fetch logic 218. The decoding unit 134 decodes the retrieved image data 122, and generates the decoded image data 124. The decoding unit 134 transmits the decoded image data 124 to the selector 128. The decoding unit 134 enables the selector 128, via the control signal 140, to transmit the decoded image data 124 to the inline conversion unit 110. The inline conversion unit 110 receives the decoded image data 124 and converts the image data 124. The inline conversion unit 110 then writes the converted image data 126 to the memory 104 for storage using the memory write logic 220.

As such, it is advantageous that both encoder and decoder paths are simplified due to less access to the memory 104 before an encoding operation and after a decoding operation performed by the encoding unit 132 and the decoding unit 134. Also, since only one read operation with the memory 104 and only one write operation with the memory 104 are performed in each of the encoder and decoder paths, a less memory bandwidth is required for traffic.

Additionally, the apparatus 100 of FIG. 3 may be configured to operate in a decoding-encoding mode where a decoder-encoder path is created where a read, decode, convert, encode, and write operation sequence is performed. In particular, the decoding unit 134 in the encoder/decoder 130 receives the retrieved image data 122 having the encoded image data 108 from the memory 104 using the memory fetch logic 218. The decoding unit 134 decodes the retrieved image data 122, and generates the decoded image data 124. The decoding unit 134 transmits the decoded image data 124 to the selector 128. The decoding unit 134 enables the selector 128, via the control signal 140, to transmit the decoded image data 124 to the inline conversion unit 110. The inline conversion unit 110 receives the decoded image data 124, and generates the converted image data 116 of the decoded image data 124. The encoding unit 132 in the encoder/decoder 130 receives the converted image data 116 from the inline conversion unit 110, and generates the encoded image data 118 based on the converted image data 116. The encoding unit 132 then writes the encoded image data 118 to the memory 104 for storage using the memory write logic 220.

FIG. 4 illustrates an exemplary inline conversion unit 110. Referring now to the examples shown in FIGS. 1-3, the inline conversion unit 110 includes an inline color conversion unit 200, an inline non-linear and linear conversion unit 204, an inline tone mapping conversion unit 208, an inline gamut remapping conversion unit 212, and an inline re-gamma conversion unit 216. Other suitable inline conversion units, such as an inline de-gamma conversion unit, are also contemplated to suit different applications. Each unit 200, 204, 208, 212, 216 performs as a hardware component of the inline conversion unit 110. Although these sub-units 200, 204, 208, 212, 216 are illustrated as children units subordinate of the parent unit, each sub-unit can be operated as a separate unit from the inline conversion unit 110, and other suitable combinations of sub-units are contemplated to suit different applications. In another embodiment, one or more units can be selectively bundled as a hardware model running on the processor or co-processor.

Initially, the inline conversion unit 110 is configured to receive the retrieved image data 114 or the decoded image data 124, which can be transmitted to the inline color conversion unit 200. In other embodiments, the retrieved image data 114 or the decoded image data 124 can be transmitted to any of the sub-units 204, 208, 212, 216. The inline color conversion unit 200 is configured to perform a color conversion between a wide-gamut colorspace and a standard-gamut colorspace without accessing the memory 104. For example, the inline color conversion unit 200 converts the wide-gamut colorspace represented in the HDR/WCG format into the standard-gamut colorspace represented in the SDR/SCG format. Then, the inline color conversion unit 200 generates color-converted image data 202.

The inline non-linear and linear conversion unit 204 is configured to receive the color-converted image data 202, and perform a non-linear and linear conversion on the color-converted image data 202 without accessing the memory 104. For example, the inline non-linear and linear conversion unit 204 performs the non-linear and linear conversion for utilizing characteristics of a human visual system (HVS) that includes non-linear responses to color or luminance characteristics of the raw or decoded image data 106. Since human eyes cannot constantly respond to a linear data representation of the image data 114, the non-linear and linear conversion is often necessary to conform to the HVS. In the present disclosure, the non-linear and linear conversion is performed without accessing the memory. The inline non-linear and linear conversion unit 204 performs the non-linear and linear conversion as necessary to conform to the HVS. Then, the inline non-linear and linear conversion unit 204 generates non-linear/linear-converted image data 206.

The inline tone mapping conversion unit 208 is configured to receive the non-linear/linear-converted image data 206, and perform a tone mapping conversion on the non-linear/linear-converted image data 206 without accessing the memory 104. For example, the inline tone mapping conversion unit 208 performs the tone mapping conversion to map one set of tones and colors to another set of tones and colors to improve the appearance of the raw or decoded image data 106 in the HDR/WCG format. For example, to enhance a brightness sensation, the tone mapping conversion is performed to map one set of tones and colors to another set of tones and colors to approximate an appearance of the image data 114 in the HDR/WCG format on a display device that has a more limited dynamic range. When the display device is inadequate to reproduce a complete range of color or light intensities present in the image data 114, the tone mapping conversion is performed to compensate the color or luminance characteristics of the image data 114. In one example, the inline tone mapping conversion unit 208 performs the tone mapping conversion to enhance the color or luminance characteristics of the raw or decoded image data 106. Then, the inline tone mapping conversion unit 208 generates tone-mapped image data 210.

The inline gamut remapping conversion unit 212 is configured to receive the tone-mapped image data 210, and perform a gamut remapping conversion on the tone-mapped image data 210 without accessing the memory 104. For example, the inline gamut remapping conversion unit 212 performs the gamut remapping conversion to change a gamut space to one of Adobe Red Green Blue (RGB), Adobe wide gamut RGB, standard Red Green Blue (sRGB), and luma and chroma components (e.g., YCbCr or Y'CbCr) color gamut spaces for producing pixel information of the raw or decoded image data 106. In the present disclosure, the gamut remapping conversion is performed without accessing the memory 104. Then, the inline gamut remapping conversion unit 212 generates gamut-remapped image data 214.

The inline re-gamma conversion unit 216 is configured to receive the gamut-remapped image data 214, and perform a re-gamma conversion on the gamut-remapped image data 214 without accessing the memory 104. For example, the inline re-gramma conversion unit 216 performs the re-gamma conversion on the gamut remapped pixel information received from the inline gamut remapping conversion unit 212 and generates gamut remapped image data. Then, in one example, the inline re-gamma conversion unit 216 generates the converted image data 116 of the raw or decoded image data 106 based on the gamut-remapped image data 214. In another example, the inline re-gamma conversion unit 216 generates the converted image data 126 of the decoded image data 124 based on the gamut-re-mapped image data 214.

In another example, a de-gamma operation can be performed on the image data 114 to produce de-gamma pixel information of the image data 114, and the de-gamma pixel information is subsequently remapped into another gamut space to produce the gamut remapped pixel information. Then, the gamut remapped pixel information can be converted into the gamut remapped image data. In the present disclosure, these conversion steps are performed without accessing the memory 104.

Figure 5:
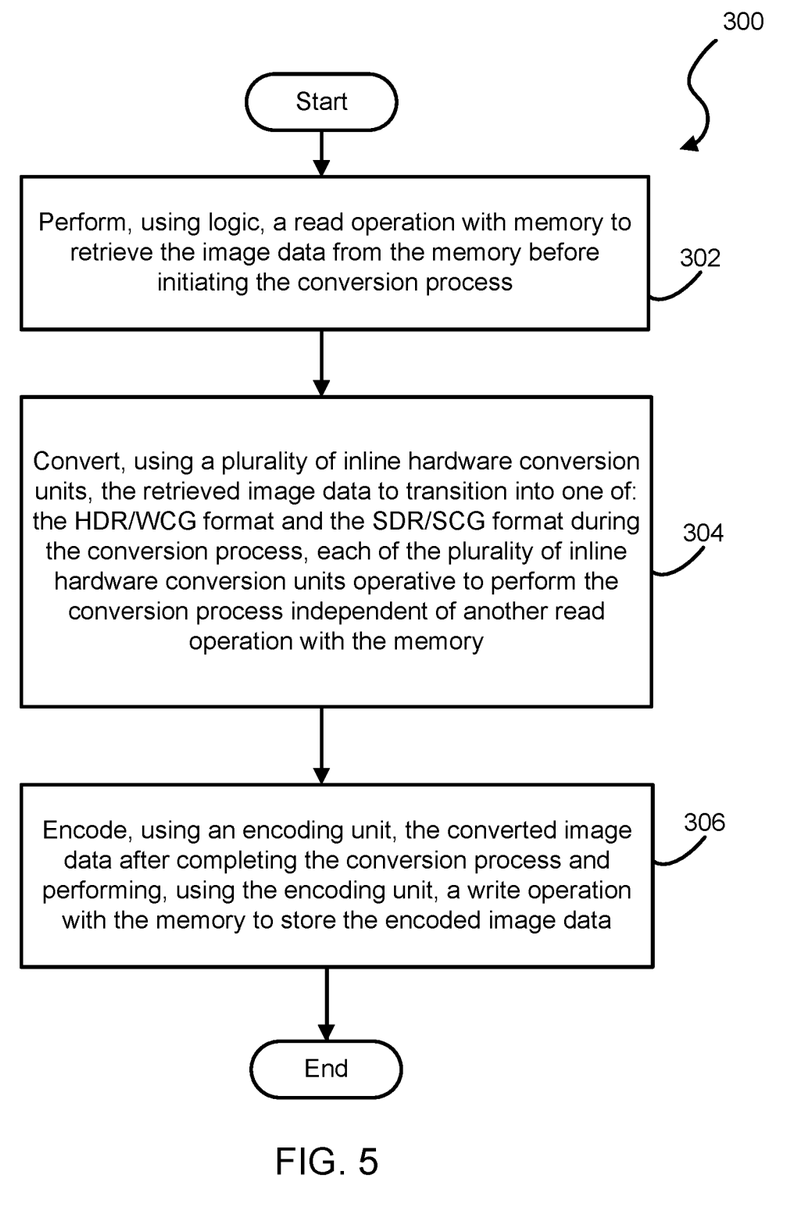
FIG. 5 is a flowchart illustrating one example of a method for performing the conversion process of the image data in accordance with one embodiment set forth in the disclosure.

FIG. 5 illustrates one example of a method 300 for processing image data in accordance with embodiments of the present disclosure. It will be described with reference to FIGS. 1 and 4. However, any suitable structure can be employed. For example, other methods with reference to FIGS. 2 and 3 are also contemplated to suit different applications.

In operation, at block 302, the inline conversion unit 110 performs a read operation with the memory 104 using the memory fetch logic 218 to retrieve the raw or decoded image data 106 from the memory 104 before initiating the conversion process. At block 304, the inline conversion unit 110 receives the retrieved image data 114 and converts the image data 114 using one or more inline hardware conversion units, such as the inline color conversion unit 200, the inline non-linear and linear conversion unit 204, the inline tone mapping conversion unit 208, the inline gamut remapping conversion unit 212, and the inline re-gamma conversion unit 216. For example, the inline conversion unit 110 converts the retrieved image data 114 into one of: the HDR/WCG format and the SDR/SCG format during the conversion process. Each of the units 200, 204, 208, 212, 216 performs a respective conversion step independent of another read or write operation with the memory 104 that stores the image data to be converted. At block 306, after completing the conversion process, the encoding unit 112 performs an encoding operation on the converted image data 116, and performs a write operation with the memory 104 using the memory write logic 220 to store the converted image data 116. The block 304 is further illustrated in FIG. 6 and the block 306 is further illustrated in FIG. 7.

Figure 6:
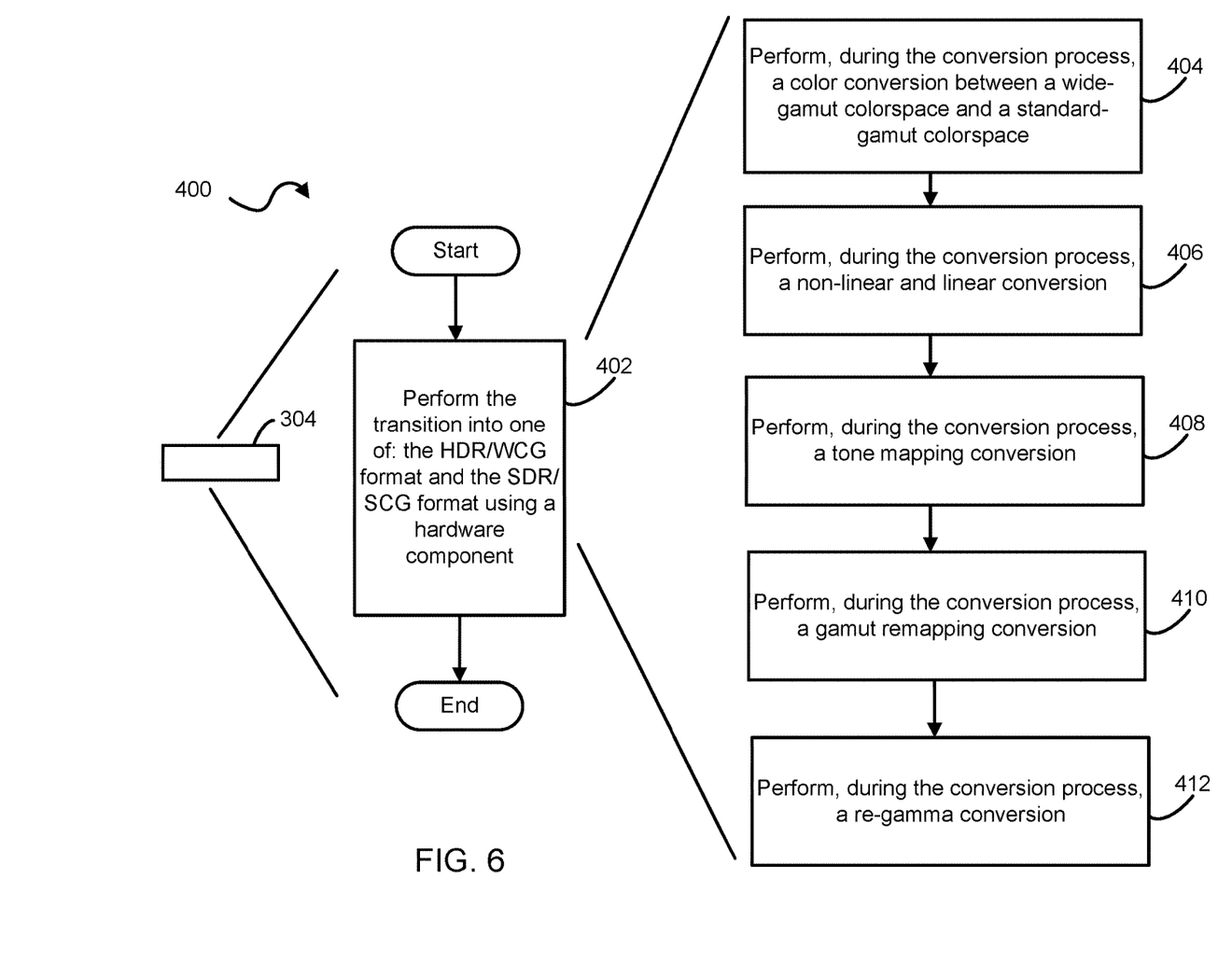
FIG. 6 is a flowchart illustrating one example of a method for converting a representation format of the image data in accordance with one embodiment set forth in the disclosure.

FIG. 6 illustrates one example of a method 400 for performing block 304 of FIG. 5 in accordance with one embodiment set forth in the disclosure. It will be described with reference to FIGS. 1, 4, and 5. However, any suitable structure can be employed. Although sub-blocks 402-412 are illustrated, other suitable sub-blocks can be employed to suit different applications.

At block 402, the inline conversion unit 110 performs the transition into one of: the HDR/WCG format and the SDR/SCG format during the conversion process using a hardware component. For example, the hardware component can be one or more of the inline color conversion unit 200, the inline non-linear and linear conversion unit 204, the inline tone mapping conversion unit 208, the inline gamut remapping conversion unit 212, and the inline re-gamma conversion unit 216.

At block 404, the inline color conversion unit 200 performs a color conversion between a wide-gamut colorspace and a standard-gamut colorspace without accessing the memory 104. For example, the inline color conversion unit 200 converts the wide-gamut colorspace represented in the HDR/WCG format into the standard-gamut colorspace represented in the SDR/SCG format.

At block 406, the inline non-linear and linear conversion unit 204 performs a non-linear and linear conversion on the color-converted image data 202 without accessing the memory 104. For example, the inline non-linear and linear conversion unit 204 performs the non-linear and linear conversion for utilizing characteristics of the HVS that includes non-linear responses to color or luminance characteristics of the raw or decoded image data 106.

At block 408, the inline tone mapping conversion unit 208 performs a tone mapping conversion on the non-linear/linear-converted image data 206 without accessing the memory 104. For example, the inline tone mapping conversion unit 208 performs the tone mapping conversion to map one set of tones and colors to another set of tones and colors to improve the appearance of the raw or decoded image data 106 in the HDR/WCG format.

At block 410, the inline gamut remapping conversion unit 212 performs a gamut remapping conversion on the tone-mapped image data 210 without accessing the memory 104. For example, the inline gamut remapping conversion unit 212 performs the gamut remapping conversion to change a gamut space to one of Adobe Red Green Blue (RGB), Adobe wide gamut RGB, standard Red Green Blue (sRGB), and luma and chroma components (e.g., YCbCr or Y'CbCr) color gamut spaces for producing pixel information of the raw or decoded image data 106.

At block 412, the inline re-gamma conversion unit 216 performs a re-gamma conversion on the gamut-remapped image data 214 without accessing the memory 104. For example, the inline re-gramma conversion unit 216 performs the re-gamma conversion on the gamut remapped pixel information received from the inline gamut remapping conversion unit 212 and generates gamut remapped image data.

Figure 7:
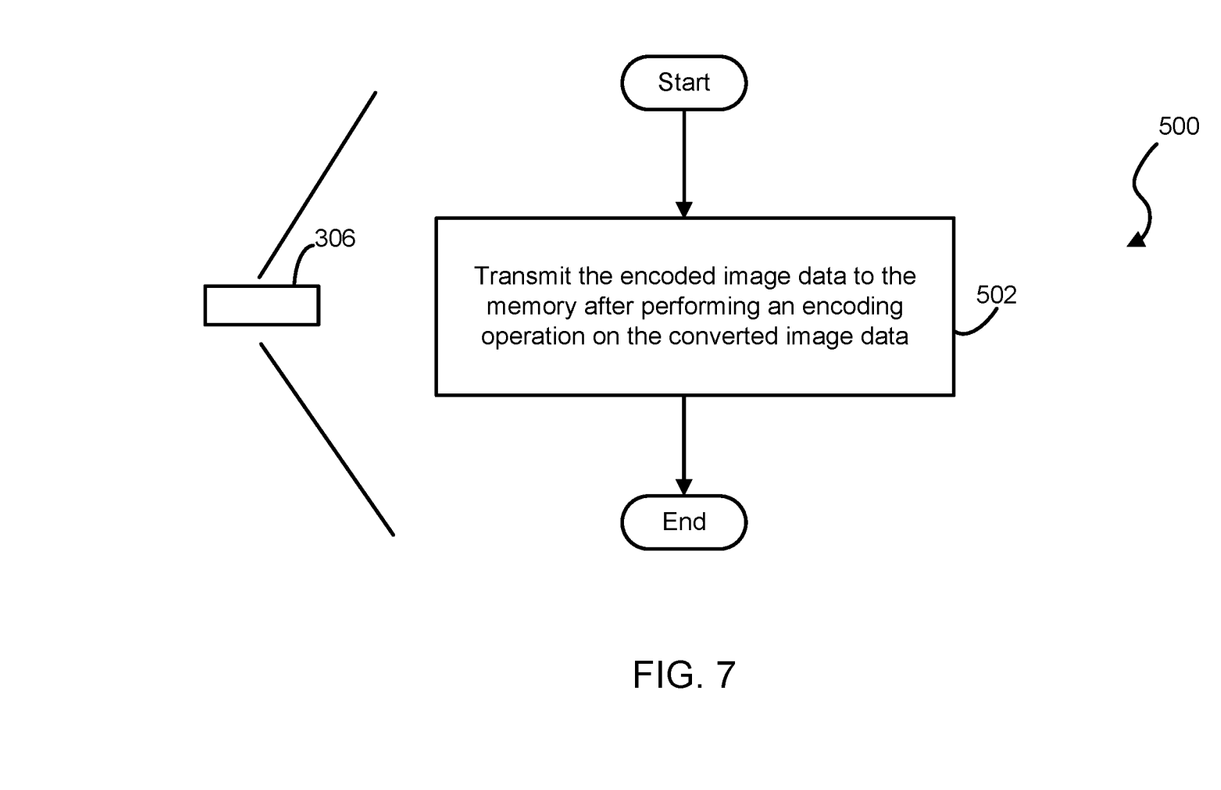
FIG. 7 is a flowchart illustrating one example of a method for performing a write operation on memory in accordance with one embodiment set forth in the disclosure.

FIG. 7 illustrates one example of a method 500 for performing block 306 of FIG. 5 in accordance with one embodiment set forth in the disclosure. It will be described with reference to FIGS. 1 and 4-6. However, any suitable structure can be employed. Although one sub-block 502 is illustrated, other suitable sub-blocks can be employed to suit different applications.

In operation, at block 502, the encoding unit 112 encodes the converted image data 116 of the retrieved image data 114 and then transmits the encoded image data 118 to the memory 104, as shown in FIG. 1.

Although the processing blocks illustrated in FIGS. 5-7 are illustrated in a particular order, those having ordinary skill in the art will appreciate that the processing can be performed in different orders to suit different applications. In one example, blocks 404-412 can be performed in any suitable order depending on the application.

Among other advantages, for example, instead of using the software shaders for the conversion process, the present disclosure provides an inline hardware HDR/WCG conversion unit, such as the inline conversion unit 110, having no software part that drains the power and increases the memory bandwidth in a memory-to-memory path. Since the software shaders are not used for the conversion process, the software shaders can be used for gaming. As such, the gaming performance will not degrade and the shaders will be continuously used for gaming. Consequently, an overall rendering operation and execution speed are improved at draw time.

Embodiments of the present disclosure are described above by way of example only, with reference to the accompanying drawings. Further, the description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present disclosure should not be so limited since other modifications will become apparent to the skilled practitioner.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A computing device configured to process image data used in a conversion process of the image data for transitioning into one of: a high dynamic range and wide color gamut (HDR/WCG) format and a standard dynamic range and standard color gamut (SDR/SCG) format, comprising:
   graphics hardware operative to execute software shaders that provide shading in an image;
   a memory operatively coupled to the graphics hardware;
   logic, also operatively coupled to the memory, and operative to perform a read operation with the memory to retrieve the image data from the memory before initiating the conversion process;
   a plurality of inline hardware conversion units operative to convert the retrieved image data to transition into one of: the HDR/WCG format and the SDR/SCG format during the conversion process, each of the plurality of inline hardware conversion units operative to perform the conversion process independent of another read operation with the memory;
   an encoding unit operatively coupled to the plurality of inline hardware conversion units, and operative to encode the converted image data after completing the conversion process and to perform a write operation with the memory to store the encoded image data; and
   wherein the plurality of inline hardware conversion units are connected directly with one another and comprise an inline color conversion unit operative to perform a color conversion between a wide-gamut colorspace and a standard-gamut colorspace, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit and an inline re-gamma conversion unit that receives an output from the inline gamut remapping conversion unit, and the plurality of inline hardware conversion units operative to convert the retrieved image data independently of the graphics hardware.

2. The computing device of claim 1, wherein the plurality of inline hardware conversion units is operative to perform the conversion process independent of another write operation with the memory.

3. The computing device of claim 1, wherein the logic is further configured to retrieve at least one of: raw image data and decoded image data.

4. The computing device of claim 1, wherein only one of the plurality of inline hardware conversion units comprises the logic operative to perform the read operation with the memory.

5. The computing device of claim 4, wherein the only one of the plurality of inline hardware conversion units is a first inline hardware conversion unit that performs the read operation with the memory.

6. The computing device of claim 5, wherein the plurality of inline hardware conversion units includes a last inline hardware conversion unit that comprises logic operative to perform the write operation with the memory, and wherein none of intervening inline hardware conversion units between the first inline hardware conversion unit and the last inline hardware conversion unit performs any read or write operation with the memory during the conversion process.

7. A computing device configured to process image data used in a conversion process of the image data for transitioning into one of: a high dynamic range and wide color gamut (HDR/WCG) format and a standard dynamic range and standard color gamut (SDR/SCG) format, comprising:
graphics hardware operative to execute software shaders that provide shading in an image;
a memory operative to the graphics hardware;
a decoding unit operatively coupled to a plurality of inline hardware conversion units, and operative to perform a read operation with the memory to retrieve encoded image data from the memory and to decode the retrieved encoded image data before initiating the conversion process;
the plurality of inline hardware conversion units operative to convert the decoded image data to transition into one of: the HDR/WCG format and the SDR/SCG format during the conversion process, each of the plurality of inline hardware conversion units operative to perform the conversion process independent of another read operation with the memory;
logic also operatively coupled to the memory, and operative to perform a write operation with the memory to store the converted image data after completing the conversion process; and
wherein the plurality of inline hardware conversion units are connected directly with one another and comprise an inline color conversion unit operative to perform a color conversion between a wide-gamut colorspace and a standard-gamut colorspace, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit and an inline re-gamma conversion unit that receives an output from the inline gamut remapping conversion unit and the plurality of inline hardware conversion units operative to convert the retrieved image data independently of the graphics hardware.

8. The computing device of claim 7, wherein the plurality of inline hardware conversion units is operative to perform the conversion process independent of another write operation with the memory.

9. The computing device of claim 7, wherein only one of the plurality of inline hardware conversion units comprises the logic operative to perform the write operation with the memory.

10. The computing device of claim 9, wherein the only one of the plurality of inline hardware conversion units is a last inline hardware conversion unit that performs the write operation with the memory.

11. The computing device of claim 10, wherein the plurality of inline hardware conversion units includes a first inline hardware conversion unit that comprises logic operative to perform the read operation with the memory, and wherein none of intervening inline hardware conversion units between the first inline hardware conversion unit and the last inline hardware conversion unit performs any read or write operation with the memory during the conversion process.

12. A computing device configured to process image data used in a conversion process of the image data for transitioning into one of: a high dynamic range and wide color gamut (HDR/WCG) format and a standard dynamic range and standard color gamut (SDR/SCG) format, comprising:
graphics hardware operative to execute software shaders that provide shading in an image;
a memory operatively coupled to the graphics hardware;
logic, also operatively coupled to the memory, and operative to perform a read operation with the memory to retrieve the image data from the memory;
a plurality of inline hardware conversion units operative to convert the retrieved image data to transition into one of: the HDR/WCG format and the SDR/SCG format during the conversion process, each of the plurality of inline hardware conversion units operative to perform the conversion process independent of another read operation with the memory;
an encoding unit operatively coupled to the plurality of inline hardware conversion units, and operative to encode the converted image data from the plurality of inline hardware conversion units after completing the conversion process;
a decoding unit operatively coupled to the plurality of inline hardware conversion units, and operative to decode encoded image data from the memory before initiating the conversion process; and
wherein the plurality of inline hardware conversion units are connected directly with one another and comprise an inline color conversion unit operative to perform a color conversion between a wide-gamut colorspace and a standard-gamut colorspace, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit, and an inline re-gamma conversion unit that receives an output from the inline gamut remapping conversion unit and the plurality of inline hardware conversion units operative to convert the retrieved image data independently of the graphics hardware.

13. The computing device of claim 12, wherein the computing device further includes a programmable codec that serves as the encoding unit and the decoding unit.

14. The computing device of claim 12, wherein the computing device further includes a selector operatively coupled between the memory and the plurality of inline hardware conversion units, and operative to select one of: the retrieved image data from the memory and the decoded image data from the decoding unit, depending on whether encoding or decoding is desired.

15. The computing device of claim 12, wherein the computing device is further configured to transmit the image data to the memory after performing at least one of: encoding the image data or decoding the image data.

16. The computing device of claim 12, wherein only a first one of the plurality of inline hardware conversion units comprises logic operative to perform the read operation with the memory, and only a last one of the plurality of inline hardware conversion units comprises logic operative to perform a write operation with the memory.

17. The computing device of claim 16, wherein none of intervening inline hardware conversion units between the only first one of the plurality of inline hardware conversion units and the only last one of the plurality of inline hardware conversion units performs any read or write operation with the memory during the conversion process.

18. A method of processing image data used in a conversion process of the image data for transitioning into one of: a high dynamic range and wide color gamut (HDR/WCG) format and a standard dynamic range and standard color gamut (SDR/SCG) format, comprising:

performing, using logic, a read operation with memory to retrieve the image data from the memory before initiating the conversion process;

converting, using a plurality of inline hardware conversion units, the retrieved image data to transition into one of: the HDR/WCG format and the SDR/SCG format during the conversion process, each of the plurality of inline hardware conversion units operative to perform the conversion process independent of another read operation with the memory;

encoding, using an encoding unit operatively coupled to the plurality of inline hardware units, the converted image data after completing the conversion process;

performing, using the encoding unit, a write operation with the memory to store the encoded image data; and wherein converting the retrieved image data comprises performing the conversion process using an inline color conversion unit operative to perform a color conversion between a wide-gamut colorspace and a standard-gamut colorspace, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit, and an inline re-gamma conversion unit that receives an output from the inline gamut remapping conversion unit wherein the plurality of inline units are connected directly with one another and wherein converting comprises converting the retrieved image data independently of graphics hardware coupled to the memory, the graphics hardware operative to execute software shaders that provide shading in an image.

19. The method of claim 18, wherein converting the retrieved image data comprises performing the conversion process independent of another write operation with the memory.

20. The method of claim 18, wherein performing the read operation comprises retrieving at least one of: raw image data and decoded image data.

21. The method of claim 18, wherein performing the read operation comprises using the logic in only one of the plurality of inline hardware conversion units to perform the read operation with the memory.

22. The method of claim 21, wherein the only one of the plurality of inline hardware conversion units is a first inline hardware conversion unit that performs the read operation with the memory.

23. The method of claim 22, wherein the plurality of inline hardware conversion units includes a last inline hardware conversion unit having logic operative to perform the write operation with the memory, and wherein converting the retrieved image data comprises having intervening inline hardware conversion units between the first inline hardware conversion unit and the last inline hardware conversion unit perform the conversion process without performing any read or write operation with the memory.

24. A method of processing image data used in a conversion process of the image data for transitioning into one of: a high dynamic range and wide color gamut (HDR/WCG) format and a standard dynamic range and standard color gamut (SDR/SCG) format, comprising:

performing, using a decoding unit operatively coupled to a plurality of inline hardware conversion units, a read operation with memory to retrieve encoded image data from the memory;

decoding, using the decoding unit, the retrieved encoded image data before initiating the conversion process;

converting, using a plurality of inline hardware conversion units, the decoded image data to transition into one of: the HDR/WCG format and the SDR/SCG format during the conversion process, each of the plurality of inline hardware conversion units operative to perform the conversion process independent of another read operation with the memory;

performing, using logic, a write operation with the memory to store the converted image data after completing the conversion process; and wherein converting the decoded image data comprises performing the conversion process using an inline color conversion unit operative to perform a color conversion between a wide-gamut colorspace and a standard-gamut colorspace, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit, and an inline re-gamma conversion unit that receives an output from the inline gamut remapping conversion unit, wherein the plurality of inline units are connected directly with one another.

25. The method of claim 24, wherein converting the decoded image data comprises performing the conversion process independent of another write operation with the memory.

26. The method of claim 24, wherein performing the write operation comprises using the logic in only one of the plurality of inline hardware conversion units to perform the write operation with the memory.

27. The method of claim 26, wherein the only one of the plurality of inline hardware conversion units is a last inline hardware conversion unit that performs the write operation with the memory.

28. The method of claim 27, wherein the plurality of inline hardware conversion units includes a first inline hardware conversion unit having logic operative to perform the read operation with the memory, and wherein converting the decoded image data comprises having intervening inline hardware conversion units between the first inline hardware conversion unit and the last inline hardware conversion unit perform the conversion process without performing any read or write operation with the memory.

29. A method of processing image data used in a conversion process of the image data for transitioning into one of: a high dynamic range and wide color gamut (HDR/WCG) format and a standard dynamic range and standard color gamut (SDR/SCG) format, comprising:

performing, using logic, a read operation with memory to retrieve the image data from the memory;

converting, using a plurality of inline hardware conversion units, the retrieved image data to transition into one of: the HDR/WCG format and the SDR/SCG format during the conversion process, each of the plurality of inline hardware conversion units operative to perform the conversion process independent of another read operation with the memory and connected directly with one another;

encoding, using an encoding unit operatively coupled to the plurality of inline hardware conversion units, the converted image data from the plurality of inline hardware conversion units after completing the conversion process;

decoding, using a decoding unit operatively coupled to the plurality of inline hardware conversion units, encoded image data from the memory before initiating the conversion process; and wherein performing the conversion process comprises using an inline color conversion unit, an inline non-linear/linear conversion unit that receives an output from the inline color conversion unit, an inline tone mapping conversion unit that receives an output from the inline non-linear/linear conversion unit, an inline gamut remapping conversion unit that receives an output from the inline tone mapping conversion unit, and an inline re-gamma conversion unit that receives an output from the inline gamut remapping conversion unit.

30. The method of claim 29, further comprising performing the encoding or decoding operations using a programmable codec that serves as the encoding unit and the decoding unit.

31. The method of claim 29, further comprising selecting, using a selector operatively coupled between the memory and the plurality of inline hardware conversion units, one of: the retrieved image data from the memory and the decoded image data from the decoding unit, depending on whether encoding or decoding is desired.

32. The method of claim 29, further comprising transmitting the image data to the memory after performing at least one of: encoding the image data or decoding the image data.

33. The method of claim 29, wherein performing the read operation comprises using only a first one of the plurality of inline hardware conversion units to perform the read operation with the memory, and the method further comprises using only a last one of the plurality of inline hardware conversion units to perform a write operation with the memory.

34. The method of claim 33, wherein performing the conversion process comprises having intervening inline hardware conversion units between the only first one of the plurality of inline hardware conversion units and the only last one of the plurality of hardware conversion units perform the conversion process without performing any read or write operations with the memory.

* * * * *